A. G. M. MICHELL & H. C. NEWTON.
HYDRAULIC MECHANISM FOR TRANSMISSION OF POWER.
APPLICATION FILED DEC. 5, 1912.

1,141,812.

Patented June 1, 1915.
6 SHEETS—SHEET 2.

Witnesses:

Inventors
Anthony G. M. Michell
Henry C. Newton
by
Atty

UNITED STATES PATENT OFFICE.

ANTHONY GEORGE MALDON MICHELL, OF MELBOURNE, AND HENRY CLEMENT NEWTON, OF KEW, NEAR MELBOURNE, VICTORIA, AUSTRALIA.

HYDRAULIC MECHANISM FOR TRANSMISSION OF POWER.

1,141,812.    Specification of Letters Patent.    Patented June 1, 1915.

Application filed December 5, 1912. Serial No. 735,129.

*To all whom it may concern:*

Be it known that we, ANTHONY GEORGE MALDON MICHELL, a subject of the King of Great Britain, residing at No. 450 Collins street, Melbourne, in the State of Victoria, Australia, and HENRY CLEMENT NEWTON, a subject of the King of Great Britain, residing at "The Cottage," Walmer street, Kew, near Melbourne, aforesaid, have invented a Hydraulic Mechanism for Transmission of Power, of which the following is a specification.

This invention relates to hydraulic mechanism for transmitting power from a primary rotating shaft to one or more secondary shafts, in order that the latter may be driven at varying speeds, and in certain cases, with either direction of rotation, without corresponding variation of the speed of the primary shaft, the apparatus hereinafter described being intended more particularly for the propulsion of motor vehicles, road and railway locomotives and boats.

The transmission is effected, as in some mechanisms of the same class previously proposed, by means of a body of liquid circulated continuously through centrifugal-pump and turbine rotors, forming respectively the driving and driven elements of the apparatus. The special features of the present invention consist in the mode of combination and arrangement of such pump and turbine elements and their casings, and in the special modes of construction of the turbine rotors and guide-vanes and auxiliary parts of the apparatus as hereinafter set forth and claimed.

The turbine-rotors employed being of the inward-flow reaction class and the pump rotors being of the usual centrifugal outward-flow type, they are so arranged in combination that the fluid flows directly from a peripheral outlet of the pump to a closely adjacent peripheral inlet of the corresponding turbine. For this purpose the casings, (which in most cases are preferably combined to form one common casing for the whole apparatus) are so formed as to consist substantially of peripheral chambers of continuously increasing sectional area, hereinafter called helices or helical chambers, surrounding the pump and turbine rotors respectively, the mouth of each pump helix being arranged to discharge into the mouth of the helix of the corresponding turbine. The helices are so proportioned that the fluid loses as little as possible of the high velocity with which it leaves the pump rotor, before delivery into the turbine rotor, all such reduction of velocity being, as is well known, productive of loss of energy. The primary object of the double-helical construction of casing just described is to enable a high velocity to be thus maintained and a high pump efficiency thus realized. Such general arrangement of helices is modified as shown in the accompanying drawings according as one or more turbine rotors are supplied from a single pump rotor, and according as the pump and turbine are required to have parallel axes, with the same or opposite directions of rotation in normal running, or to have their axes inclined, or at right angles, to one another.

In these drawings, dot-dash lines on various figures indicate the lines on which the sections illustrated are made, each line being numbered in Roman numerals to correspond with the number of the sectional figure corresponding to such line.

Figures 1 to 5 are diagrammatic sections, showing the types of apparatus in which the invention may be applied and the mode of circulation of the fluid; Figs. 6, 7, 8, 9, 10 and 11 illustrate the application of the invention to parallel shafts; Fig. 9 a transverse section on line IX—IX of Fig. 8; and Figs. 10 and 11 detail sectional views showing the operation of turbine guide-vanes. Figs. 12 to 18 illustrate the application of the invention to a pair of co-axial secondary shafts at right angles to the primary shaft.

In the diagrammatic Figs. 1 to 5, curved arrows are used to indicate the directions of rotation of the rotors, and straight arrows to indicate the directions of flow of the fluid.

Figure 1:
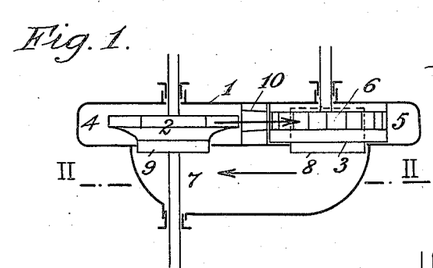
Fig. 1 being an axial section, and Fig. 2 a transverse section of the general type of such apparatus.
Figure 2:
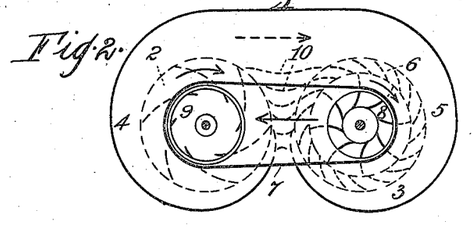

In Figs. 1 and 2 the common casing 1, consists as hereinbefore described of two helical chambers surrounding respectively the pump rotor 2 and turbine rotor 3 both rotating clockwise as shown in Fig. 2. The pump rotor 2 discharges the fluid tangentially out of the mouth of its peripheral helix 4 and tangentially into the opposed mouth of the symmetrically arranged turbine helix 5 from which it flows into the turbine guide-vanes 6 and turbine rotor 3. These parts are shown by dotted lines in Fig. 2, which is a section through the return-flow chamber 7 connecting the axial outlet 8 of the turbine rotor 3, with the axial inlet or eye 9 of the pump rotor 2. In all cases the return chambers, as well as the helical chambers themselves are made as short and direct as possible, for the purpose of diminishing frictional losses in the fluid, which as hereinbefore explained is, for reasons of efficiency, circulated at high velocity. For the same purpose of shortening the paths of fluid flow and for other reasons explained hereafter the helices 4 and 5 may not extend around the whole periphery of the rotors 2 and 3, but the fluid may be conducted from a portion of the periphery of rotor 2 to a corresponding portion of guide-vanes 6 by means of auxiliary guide-blades 10. Alternatively such auxiliary guide-blades may be employed in connection with one rotor only, the helix of the other rotor being complete, such arrangements being more fully described hereinafter. In this and the other forms the helix is constructed with its sectional area at each point as nearly as possible proportional to the flow, so that the velocity is uniform throughout.

Figure 3:
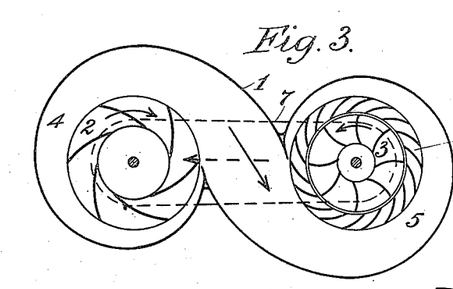
Fig. 3 a transverse section of a modified form with opposite direction of rotation of the turbine-element.

In Fig. 3 the pump rotor 2, turbine 3 and guide-vanes 6 are constructed and arranged substantially as described in connection with Figs. 1 and 2, except that the rotors are adapted to rotate in directions opposite to one another as shown by the curved arrows. With this object the helices 4 and 5 are so connected mouth to mouth as to form an S-shaped figure, instead of a C-shaped figure as in Fig. 2. The fluid is returned from the turbine to the pump, as in Figs. 1 and 2, through the return chamber 7.

As will be evident, the mode of construction and operation of the apparatus shown in Figs. 1, 2 and 3 may be applied without alteration if the planes of the turbines and pump rotors lie at an angle with one another, instead of coinciding as shown in those figures. In such alternative arrangement which is more fully described hereinafter in connection with Figs. 12 to 18, the pump helix will discharge transversely or obliquely into the turbine helix, instead of along a common tangent line as in Figs. 1, 2 and 3. In either case the flow into and out of the helices is substantially tangential to the respective rotors, as stated above.

Figure 4:
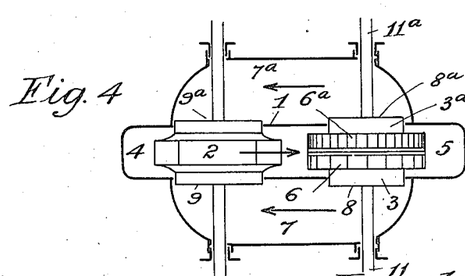
Fig. 4 an axial section corresponding to Fig. 1 but with a double turbine giving either direction of rotation.

In the construction shown in Fig. 4, a compound turbine-rotor is employed which consists of two parts or sections 3 and 3$^a$, used for forward and reverse driving respectively. According to the purpose to which the mechanism is to be applied, the forward and reverse parts of the rotor may be mounted respectively on separate co-axial shafts 11 and 11$^a$ extended out of the casing in both directions as shown and capable of independent rotation, or both parts of the rotor may be on one shaft alternatively running in one or the other direction according as one or the other part of the rotor is in action. The pump rotor 2, and the turbine rotor are relatively situated as shown in Figs. 1 and 2 and are surrounded by peripheral helices 4 and 5 as explained in connection with those figures, but the pump rotor is made double with two axial inlets 9 and 9$^a$ on opposite sides, receiving respectively the circulated fluid through one or the other of the return chambers 7 and 7$^a$, from one or the other of the outlets 8 and 8$^a$ of the respective parts 3 and 3$^a$ of the turbine rotor according as one or the other part of the latter is being operated. A cylindrical sliding gate, not shown in Fig. 4, arranged as hereinafter particularly described in connection with Figs. 12 to 18, surrounding and arranged to slide axially over the peripheries of the parts 3 and 3$^a$ of the rotor, or any equivalent known form of turbine control-gate, may be used to shut off the fluid from one or the other part of the turbine, leaving only the one required in action, or from both parts of the turbine together so as to stop the whole of the driven mechanism without stopping the pump. The two parts 3 and 3$^a$ of the turbine rotor are shown as the direct and reverse motors respectively, and as hereinbefore stated the forward running part 3 of the turbine rotor and its guide-vanes 6, will be constructed as shown in Fig. 2. The reverse part 3$^a$ of the turbine and its guide-vanes 6$^a$ will be constructed substantially as shown in Fig. 5, the guide-vanes 6$^a$ being recurved as shown so as to approximately reverse the direction of flow of the fluid entering the helix 5 as shown by the straight arrow, before it enters the periphery of the part 3$^a$ of the rotor, thus propelling the latter in an anticlockwise direction as shown by the curved arrow.

Figure 5:
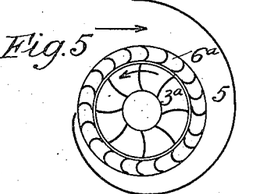
Fig. 5 a transverse section through the reverse turbine of Fig. 4.

The mode of construction of the turbine element shown in Fig. 5 may also be applied in connection with the construction of pump-rotor 2 and common casing 1 shown in Fig. 2, in cases wherein it is desired to drive a single secondary shaft in the opposite direction to the primary shaft, instead of employing the mode of construction shown in Fig. 3 for this purpose.

Figure 6:
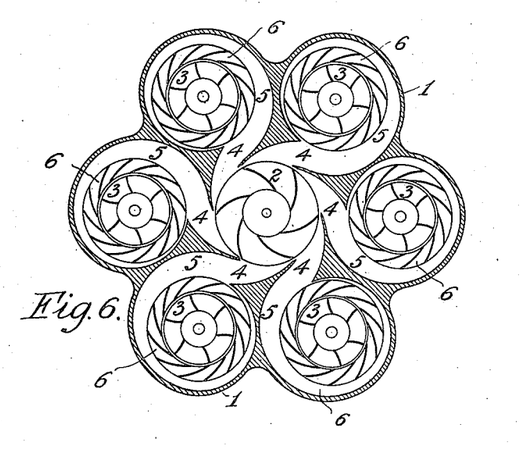
Figs. 6 and 7 being respectively transverse and axial sections of one arrangement and Fig. 8 being an axial section of another arrangement.
Figure 7:
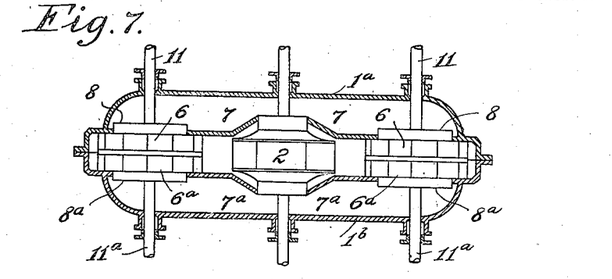

Figs. 6 and 7 illustrate the application of the invention to the driving of a number of spindles by means of a single pump element, Fig. 6 being a transverse section analogous to Fig. 3 and Fig. 7 an axial section analogous to Fig. 4.

The pump rotor 2, is situated at the center of the casing 1, which may be divided transversely into two portions 1ª and 1ᵇ as shown in Fig. 7. The fluid from the rotor 2 is discharged through each of the six partial helical chambers 4, to one of the helical chambers 5, each of which surrounds one of the turbine elements.

Each of the turbine elements, like that shown in Fig. 4 may be furnished with two peripheral series of fixed guide-vanes, one series 6 being adapted for forward, and the other series 6ª for reverse driving, the turbine rotor being also double and fitted with corresponding forward and reverse blades, discharging at opposite ends of the rotor at 8 and 8ª. By means of cylindrical sliding-gates, (hereinafter described in relation to Figs. 8–18), one or the other pair of vanes and blades may be opened to the fluid, delivered by the pump rotor 2, and the turbine rotor and its spindle 11, 11ª, rotated in either direction at will. The fluid discharged from the turbine at 8 or 8ª, is returned to the pump rotor by the passage 7 or 7ª.

The mechanism shown in Figs. 6 and 7, may be adapted to drive, as by means of flexible shafting attached to either end of the spindles 11, 11ª, a group of machines, as for instance machine-tools in a workshop, or portable drills or the like in an erecting yard. For such application the turbine gates will be independent, so that any machine may be controlled without regard to the others. For other applications, the gates may be interconnected so as to operate simultaneously, in ways well understood, examples being described below in connection with Figs. 8 to 18.

Figs. 8, 9, 10 and 11 illustrate the application of the invention to the driving of a pair of secondary shafts parallel to the primary shaft, the arrangement being devised particularly for use on motor vehicles and mechanically propelled boats.

The primary shaft 12 which carries the pump rotor 2 may be directly coupled to the engine shaft as by a coupling 13 and may extend through the common casing 1 of the pump and turbines, running in stuffing boxes 14 and 15, and may have a journal 16 at the end opposite to the coupling 13, such journal being carried by a bearing, not shown in the drawing, which may be rigidly secured to the casing 1. The pump rotor 2 as in Fig. 4 is double, having two inlets 9 and 9ª but in the present case both inlets are in operation simultaneously. The common casing 1 may, for convenience, be divided into two halves by the joint 17, Fig. 9, in the plane through the axes of the pump or primary shaft 12 and the turbine shafts 11, Fig. 8 being a section in the plane of this joint.

The casing 1, as set forth in connection with the diagrammatic Figs. 1 to 5, comprises helical chambers surrounding the pump rotor 2 and the turbine guide-vanes 6 and 6ª. The pump rotor however, instead of having a single helix, as in Figs. 1 to 5, extending around substantially the whole of its periphery, has two such helical chambers 4 and 4ª each extending around substantially one half of its periphery, see Fig. 9, each of these chambers discharging, in the manner already described in connection with Figs. 1 and 2, into the helical chamber 5 surrounding one of the turbines. Each turbine has a two-part rotor 3 and 3ª for forward and reverse running, one such compound rotor being mounted on each turbine shaft 11, which like the pump shaft 12 extends through the casing 1 from side to side, leakage being prevented by the stuffing-boxes 18, 19. The forward and reverse parts 3 and 3ª of the rotors, take opposite relative positions in the two turbines, so that the fluid discharged from the turbines goes to both pump inlets 9, 9ª, and thus the pump rotor is hydraulically balanced, irrespective of which parts 3 or 3ª of the rotors are in use. The turbine shafts 11 are formed with journals 20, 21 at each end, running in bearings, not shown in the drawings, which may be rigidly secured to the casing 1. Thrust bearings may be combined with one or both of the bearings 20, 21.

For application to motor vehicles the turbine shafts 11 may be fitted with universal couplings 22 connecting them to propeller shafts 23 extending longitudinally rearward in the vehicle and each geared to one of the rear, or driving, wheels thereof by worm or bevel gearing, as will be well understood, the usual differential gearing of such vehicles being thus dispensed with. For application to boats, the couplings 22 may be dispensed with or may be rigid, the propeller shafts 23 being carried through the stern of the boat and each fitted with a propeller as usual in twin screw boats.

The pump helices 4 and 4ª may be supplemented by guide-blades 10 and 10ª, Fig. 9, as described in connection with Fig. 2. By inspection of Fig. 9, it will be apparent that the use of such guide blades enables the pump rotor 2, and turbine guide-vanes 6, 6ª, to be brought closer together than would be the case if the helices 4, 4ª, 5, were extended around the whole periphery of their respective rotors, thus economizing space and weight.

The guide-vanes 6 and 6ª of each turbine may be constructed in one rigid cylindrical sleeve G composed in addition to the vanes 6 and 6ª of blank annular portions 24ª, 24ᵇ and 24ᶜ. These cylindrical sleeves G, hereinafter called gate-cylinders or gates, are capable of being moved axially relatively to the turbine rotors by means of the rods 25 secured to such gate-cylinders G and operated by pins engaging with slots in the rocking lever 26 pivoted on the fulcrum 27 in such a manner that any movement of the rocking lever 26 communicates equal but opposite movements to the rods 25 and hence to the gate cylinders G.

Figures 8, 9, 10:
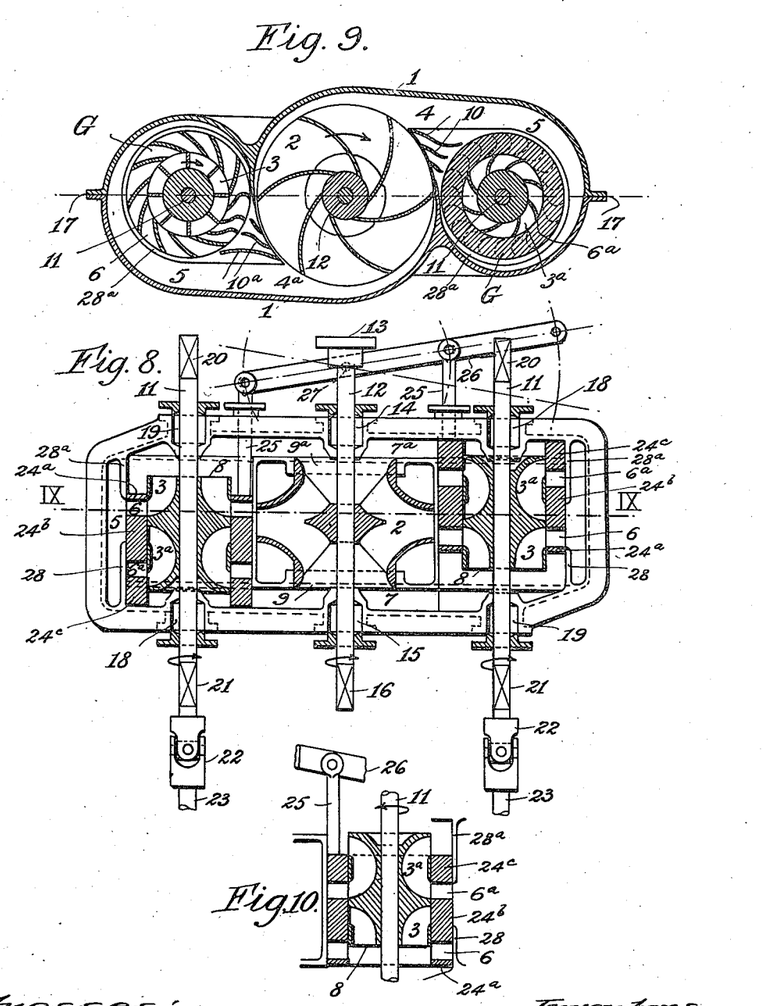

The rocking lever 26, and gates G being in the positions shown in Fig. 8, which is the position for forward running of the turbine, the fluid is discharged from the pump rotor 2 in substantially equal quantities through the helices 4 and 4ª, into the turbine helices 5, and thence through the vanes 6, into the parts 3 of the turbine rotors, rotating them in the clockwise direction, like the pump rotor itself, as will be clearly understood from the left hand portion of Fig. 9. When the gates are in this position the inlets to the reverse parts 3ª of the turbine rotors are closed by the blank annuli 24ᵇ of the gates G, and the outlet of the said parts 3ª of the rotors are also at the same time wholly or substantially closed by the blank annuli 24ᶜ. By this means not only is the flow of fluid through the parts 3ª of the rotors, which would act in opposition to the parts 3 thereof, prevented, but by covering the edges of the rotor-vanes of parts 3ª, any frictional resistance which they offer to the rotation is minimized. From the parts 3 of the rotors the fluid is discharged by their outlets 8, in substantially equal quantities through the return chambers 7, 7ª, to the two inlets 9, 9ª, of the pump rotor 2, the return chambers 7, 7ª, being shut out of direct communication with the turbine helices 5 by the internal walls 28, 28ª of such helices and by the annuli of the gates G.

When the lever 26 and gates G are moved to their other extreme positions as shown for the right hand turbine of Figs. 8 and 9 in Fig. 10, the inlets of the reverse turbine parts 3ª of the rotors are open to the turbine helices 5, through the reverse guide-vanes 6ª. At the same time the forward parts 3 of the rotors are closed by the blank annuli 24ᵇ and the forward guide blades 6, and turbine outlets 8, by the internal walls 28, but the reverse turbine outlets are open to the return chambers 7 and 7ª. This is the position of the gates for reverse running at maximum power. It will be readily understood that all degrees of power less than the maxima for forward and reversed running may be obtained by placing the gates G in intermediate positions, between those above set forth, by means of the rocking lever 26, and also that, as the blank annulus 24ᵇ of the gate, is of sufficient axial length to cover the inlets of both parts 3 and 3ª of the rotors simultaneously, the circulation of fluid and rotation of both secondary shafts may be stopped by placing the gate in the proper position, while the pump and engine continue to run. It will also be understood, that the reverse parts 3ª of the turbines may be used as brakes to oppose the forward motion of the vehicle or boat, by opening their inlets while the turbine shafts 11, and the vehicle or boat itself, are moving in the forward direction. In certain cases, as for instance in the application of the invention to boats with twin propeller shafts, the turbine gates may be controlled independently of one another by omitting the rocking lever 26 and separately operating the rods 25, thus enabling any required variation in the relative speeds and directions of rotation of the secondary shafts to be made.

It is not essential that the forward parts 3 of the turbines should be constructed with axial outlets 8, or the reverse parts of the turbines with peripheral outlets, as they are respectively shown and above described, but each of them may have either an axial or peripheral outlet, as may be preferred for constructional or other reasons.

The forms shown are however advantageous for application to road vehicles in that the forward turbine, with an axial outlet, automatically opposes as its speed rises a back pressure to the pressure produced by the pump, and thus tends to prevent a dangerous speed being obtained by the vehicle, while the reverse turbine with peripheral outlet can more readily be constructed to meet the common requirement in such vehicles of large turning couples at low speeds, than if formed with an axial outlet.

Figure 11:
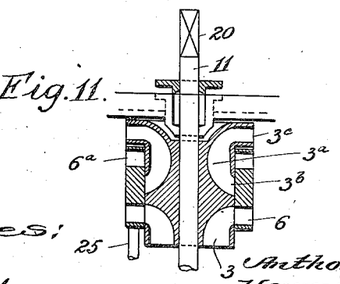

The reverse turbine may alternatively be constructed as shown in Fig. 11, with its peripheral outlet 3ᶜ of larger diameter than its inlet 3ᵇ, the blank portion 24ᶜ of the gates G, Fig. 8, being then dispensed with. With such construction the reverse part 3ª of the turbine rotor at high speeds tends to pump the fluid through the system, in the same direction as in the normal operation of the gear, and thus to drive the pump rotor 2 in the normal direction, assisting the engine or maintaining the rotation of the pump independently of the engine. In the application of this construction to motor vehicles, the reverse part 3ª of the rotor being put in action at high vehicle-speeds on the down grade, the engine may be kept in action with the throttle valve closed, and with consequent economy of fuel.

It is to be understood that the provision of forward and reverse blades and guide vanes for each rotor shaft is not an essential feature of the arrangement described above in connection with Figs. 8 to 11, but the same general mode of construction may be applied where the turbines are required to run in one direction only.

Both forward and reverse turbines may be fitted if desired with fixed outlet guide blades as described hereafter in connection with Figs. 12 to 18 by which the kinetic energy of the water discharged from the turbines may be partially reconverted into pressure energy, in a manner well understood, and undue rotation of the water entering the pump inlets prevented.

The apparatus shown in Figs. 8 to 11, may also be fitted with other auxiliary apparatus described later in connection with Figs. 12 to 18.

Figs. 12 to 18 illustrate the application of the invention to a pair of secondary shafts having a common axis at right angles to the axis of the primary shaft, all three being in one plane, assumed to be horizontal for facilitating the explanation. The arrangement of apparatus shown and hereinafter described is designed particularly for use in motor-vehicles being intended to be swung on the rear axles of the vehicle, the axles being partly shown in the drawing and marked 30, 31, in a somewhat similar manner to the usual differential-box. The primary shaft 12, which carries the pump-rotor 2, may be coupled to a propeller shaft of the usual kind flexibly coupled to the engine shaft, and run in a stuffing box 32 to prevent leakage of the fluid. The common casing 1 of the pump and turbines is preferably divided as shown by a joint 17 through the plane of the axes in the manner already described in connection with Figs. 8 to 11.

The pump rotor 2 is surrounded by two helical chambers 4, 4ᵃ formed in the casing 1, such chambers extending circumferentially around the periphery of the rotor with sectional areas uniformly increasing from their commencing points which are approximately diametrically opposite one another and delivering respectively into the helical chambers 33, 34, and thence alternatively into the forward guide-vanes 35ᵃ, 36ᵃ, or reverse guide-vanes 35ᵇ, 36ᵇ, of the two turbine rotors 37, 38.

The rotors 37, 38, are rigidly mounted respectively on the shafts 39, 40 which are capable of independent rotation and extend in opposite directions out of the casing 1, through the stuffing-boxes 41 and 42, and are carried respectively by bearings 43, arranged in chambers 44, 45, of the casing 1, or otherwise rigidly mounted therein.

The shafts 39, 40 may each carry a pinion 46, whose teeth, preferably helical, gear with a corresponding toothed wheel 47, mounted on the corresponding road-axle 30 or 31, such gears running respectively in gear boxes 48, 49, which may be divided into parts 48ᵃ, 48ᵇ, 48ᶜ, 49ᵃ, 49ᵇ, 49ᶜ, for convenience of construction as will be readily understood. The pairs of sections 48ᵇ, 48ᶜ, and 49ᵇ, 49ᶜ may be utilized to clamp and secure the tubes 50, 51, inclosing the road axles 30 and 31. The inner ends of these axles may have roller bearings 52 and thrust bearings as 53, mounted in chambers, or housings 54, 55, provided in the casing 1, or in the gear-boxes 48, 49.

The outer ends of the axles 30, 31, are mounted in the usual manner in bearings, not shown in the drawings, rigidly attached to the tubes 50 and 51, and by means of these bearings together with the inner bearings 52, the casing 1 and its contained gearing are suspended in the same manner as the ordinary differential gear-box from the axles.

The arrangement of gear-wheels as above described is adapted for use in the common case of road vehicles having axles requiring a lower speed than can conveniently be arranged for the turbine-shafts. When the conditions of use of the mechanism are such that this is not the case the power may be applied directly by rigid or flexibly-coupled extensions of the turbine-shafts themselves. Alternatively the turbine shafts may be geared to the axles by chains, and in this case the casing 1 may be rigidly connected to the chassis of the vehicle, instead of being suspended on the axles 30 and 31 as shown in the drawings and explained above.

Figures 13, 14, 18:
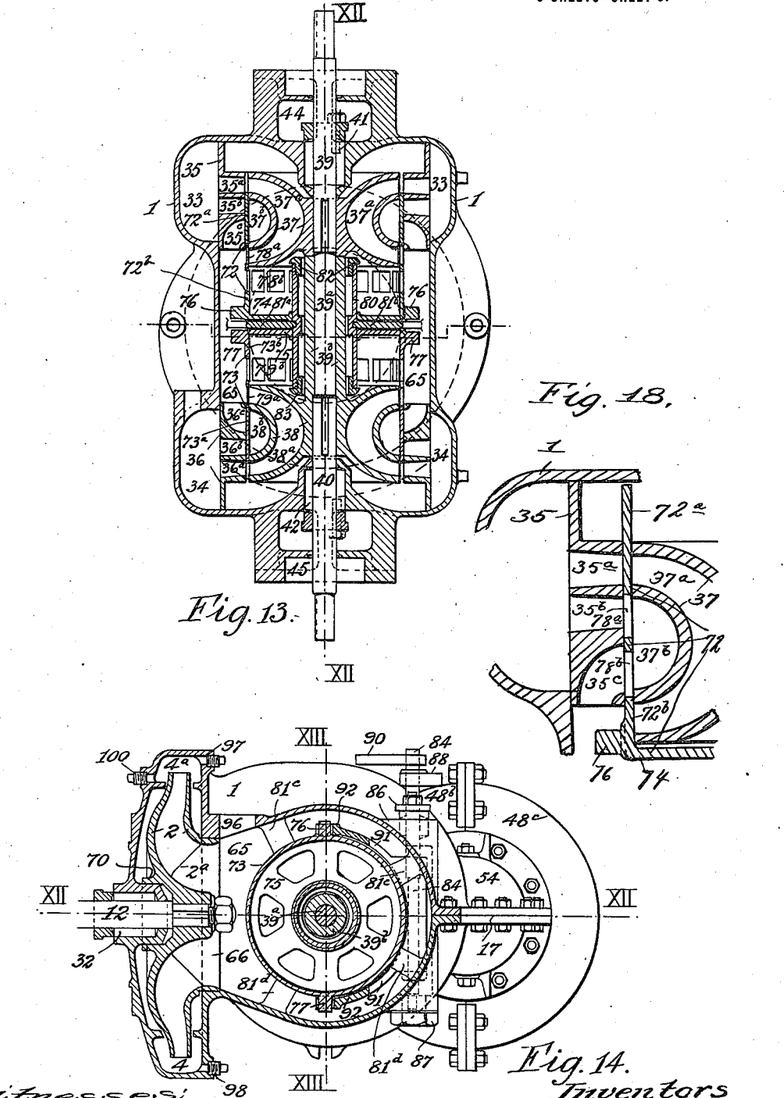
Fig. 13 a section through the turbine axes at right angles to Fig. 12.
Figs. 14 and 15 sections transverse to the turbine and pump shafts respectively.
Fig. 18 an enlarged detail of Fig. 13.

As above stated the turbine rotors 37, 38, and consequently the road-axles 30, 31, are capable of independent rotation, thus enabling differential gearing of the kind usually fitted to such axles to be dispensed with. To carry out this object and to avoid the necessity of providing fixed bearings for the turbine shafts in the interior of the casing 1, the spindle 39 of one of the turbine rotors 37 is extended beyond the rotor in the form of a long journal 39ᵃ and the other rotor 38 is provided with a long boss 39ᵇ, extending beyond the inner end of the spindle 40, such boss being bored to a working fit on the journal 39ᵃ. As already stated, the turbine rotors 37, 38, are rigidly mounted on their respective shafts 39 and 40, and as will be explained hereinafter the fluid pressure at their outer or remote ends is always, while the mechanism is in operation, greater than that at their inner or adjacent ends, so that the rotors tend to press inwardly one against the other. As shown in Fig. 13 the end of the extension $39^b$ of the rotor 38, abuts on the boss of the rotor 37. Alternatively the end of the extension $39^a$ of the shaft 39 may abut on the end of the shaft 40, the bosses of the rotors 37 and 38 having a clearance between them, instead of the bosses abutting and the shafts having a clearance as shown. In either case washers, not shown, may be inserted between the abutting ends of the shafts or bosses, in ways well understood, to regulate the friction and distribute the wear.

In order to provide for the inward pressures or thrust exerted on the two rotors by the fluid pressures, as hereinafter described, not being precisely equal, thrust washers 56 may be inserted between the driving pinions 46, and faces 57 formed on the gear cases $48^a$, $49^a$, or between other suitable rotating and stationary parts, in order to take the unbalanced thrust.

In cases which do not demand differential rotation of the two spindles as above described, the turbine rotors 37, 38 may be rigidly mounted on a common spindle taking the place of the two spindles 39, 40. This arrangement may be adopted, for instance in the application of the invention to railway locomotives, in which case the running wheels may be mounted on the common shaft taking the place of the spindles 39, 40, and forming a running axle, mounted on a bogie of the locomotive, or otherwise.

Figure 15:
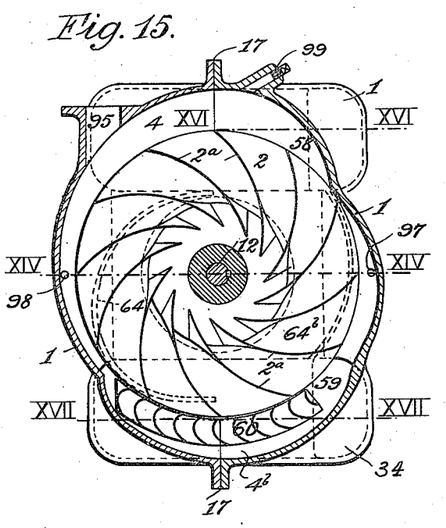

As hereinbefore stated the two turbines 37 and 38 are respectively supplied by the pump rotor 2 with fluid through the helical-chambers 33 and 34, from the pump-chambers 4 and $4^a$ respectively. The pump chamber 4 may extend around approximately one-half of the perimeter of the pump as shown in Fig. 15 delivering at its mouth 58 into the mouth of the turbine helix 33. The chamber $4^a$ commencing at 58 extends circumferentially around the periphery of the rotor 2 to its mouth 59 at the entry of the turbine helix 34 into which it discharges. The fluid discharged from the rotor 2 through the chamber $4^a$ is supplemented by that discharged from the rotor between the mouth 59 of the chamber $4^a$ and the commencement of the chamber 4. In order to deliver this latter portion of the discharge without loss of its kinetic energy, guide-vanes 60, analogous to the guide-vanes 10 of Figs. 1 and 2, are arranged between cheek-plates 61, 62, and closely adjacent to the periphery of the rotor 2, in the peripheral chamber $4^b$.

Figure 17:
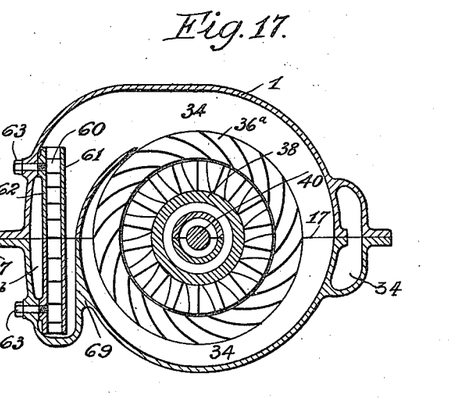

These guide vanes 60 are of recurved shape as shown, and reverse the tangential component of the fluid discharged from the corresponding portion of the rotor, so that such fluid is delivered in a substantially upward direction, as viewed in Figs. 15 and 17, to flow at 59 into the turbine chamber 34 together with the fluid delivered from the chamber $4^a$. The cheek-plates 61, 62, and their attached vanes, are preferably divided on the plane of the joint 17 into an upper and lower portion respectively attached, as by stud-bolts 63, to the upper end and lower portions of the case 1.

In order to assist in attaining the desideratum hereinbefore stated, that the sectional area of each helix should be proportional at each point to the quantity of fluid flowing through it, ribs 64, $64^a$, $64^b$, may be formed on the interior of the walls of the casing 1 surrounding the pump rotor 2, whereby the effective area of the chambers 4, $4^a$, $4^b$, is increased by the spaces between the rotor 2 and the case 1 extending inwardly from the rotor-periphery to such ribs 64, $64^a$, $64^b$. The pump-rotor 2 is fitted with blades $2^a$, of the form usual in centrifugal pumps, producing at a given rotational speed a greater difference of pressure between the outer and inner ends of such blades when the flow of fluid, as regulated by the turbine gates hereinafter described, is small than when it is large. This property may be taken advantage of for purposes of regulation as hereinafter described. The pressure generated at the periphery of the rotor, as well as the kinetic energy as already stated, are maintained as far as possible without diminution up to the entry of the turbine guide-vanes.

The forward and reverse guide-vanes, $35^a$, $35^b$ and $36^a$, $36^b$ are preferably formed in two stationary cylindrical sleeves 35, 36, surrounding the respective rotors 37, 38, and fixed in the casing 1 so as to close the turbine helices 33 and 34 respectively, except at their mouths 58 and 59, and at the openings into the turbine-guide vanes $35^a$, $35^b$ and $36^a$, $36^b$. Fluid entering the vanes $35^a$, $36^a$ is delivered by them upon the forward turbine rotor blades $37^a$, $38^a$, respectively, from which it is discharged, as shown, directly into the return chamber 65, while fluid entering the vanes $35^b$, $36^b$ is delivered upon the reverse rotor blades $37^b$, $38^b$, from which it is discharged through the blades $35^c$, $36^c$, respectively and thence likewise into the chamber 65. The blades $35^c$, $36^c$, are preferably formed in or attached to the sleeves 35, 36.

The pressure of the fluid diminishes in its passage through the guide-vanes but remains greater at their inner ends than the pressure in the return chamber 65, as is usual in reaction-turbines, so that there is a drop of pressure between the inlets and outlets of the turbine rotors 37 and 38. The construction, as will be seen from Fig. 13, is such that the pressure over the outer or remote ends of the rotors 37 and 38 will be substantially the same as that at the inner ends of the guide-vanes, and that over the inner or adjacent ends substantially the same as in the return-chamber 65, so that as hereinbefore stated there is a difference of pressure forcing the two rotors in an axial direction toward one another. The inlet 66 of the pump rotor 2 draws the fluid directly from the chamber 65, and the circulation is thus completed.

Figure 12:
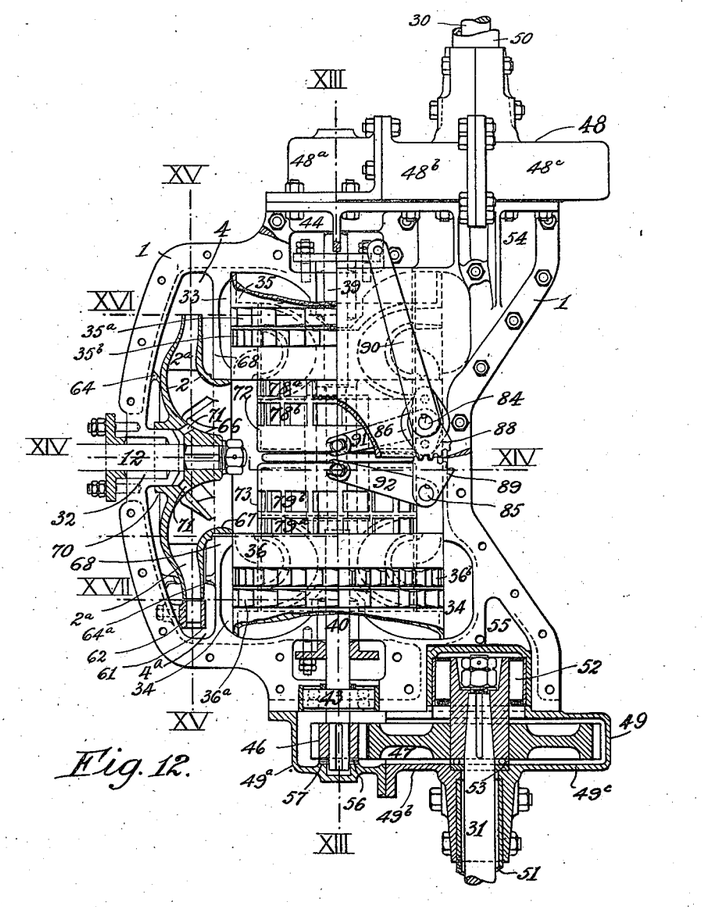
Fig. 12 being partly a plan and partly a section in the common horizontal plane of the three shafts.
Figure 16:
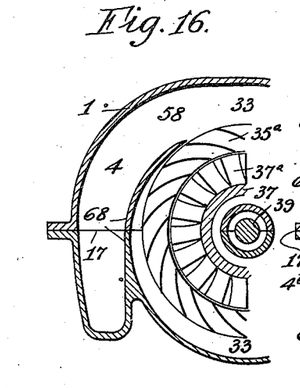
Figs. 16 and 17 partial sections parallel to Fig. 14.

Such pump inlet 66, is surrounded by the neck-ring 67 forming an integral part of the rotor 2, and rotating with minimum practicable clearance inside a circular aperture between the pump chamber and the return chamber 65, being formed partly in the walls 68, 69, of the casing 1 between the pump-chamber and the turbine helices 33, 34, as shown in Figs. 12, 16 and 17, and partly in the external portion of the casing 1 as shown in Fig. 14.

On the opposite side, or back, of the pump rotor 2 the faucet-ring 70 may be formed, surrounding with a similar clearance the exterior of the cylindrical stuffing-box 32, the back of the rotor 2 being pierced with suitable holes 71, to equalize the pressure between the stuffing-box 32 and the back of the rotor 2 with that in the front or suction side of the latter, and thus minimize thrust, in a well-known manner.

In order that the turbine-rotors 37, 38, and consequently the vehicle itself, may be driven in either direction or slowed or stopped at will while the engine and pump continue to run, turbine-gates 72, 73, are provided. These consist of cylindrical sleeves, of uniform thickness, having preferably formed integral therewith end webs, 74 and 75, and each carrying a pair of studs or gudgeons 76, 77. The end webs 74, 75, are bored to slide freely over the outer cylindrical surface of the tube 80, which surrounds the boss $39^b$ of the rotor 38, being rigidly supported at the middle of its length by the top and bottom webs $81^a$, $81^b$, formed integral with or rigidly secured to the casing 1, and together forming a kind of diaphragm in the center of the return chamber 65. These webs $81^a$, $81^b$, may preferably be connected to the outer wall of the casing 1 by arms $81^c$, $81^d$, respectively, having spaces between them. End pieces 82, 83, may be attached to the tube 80, to limit the motion of the webs 74, 75, of the gates 72, 73, in the outward direction, their inward motion being limited by the webs, $81^a$ and $81^b$. The movement of these gates may be effected as follows:—In the return chamber 65 and transversely to the turbine axes, two spindles 84, 85, are fitted, passing out from the chamber through stuffing boxes such as 86, fitted in the case 1, plugs as 87 being provided at the opposite ends of the spindles to serve as bearings for them. The spindles 84, 85, are geared together by toothed sectors 88, 89, preferably external to the case, and one of them is fitted with a lever, 90, by means of which it can be rotated by a connecting rod from a pedal lever, not shown in the drawings, or other suitable means.

Inside the return chamber 65, the spindles 84, 85, have respectively secured to them the arms 91, 92, having double forked ends which engage respectively with the studs 76, 77, on the gate-sleeves 72, 73. It will be seen that when the spindle 84 is partially rotated by the lever 90, clockwise as seen in Fig. 12 from the position therein shown, the arm 91 will be rotated through the same angle, and will displace the gate 72 from the position in which it is shown toward the stop 82. At the same time the spindle 85 and arm 92 will be rotated through an equal but opposite angle by the engagement of the sectors 88, 89, and the gate 73 will be displaced toward the stop 83.

The gates 72, 73, which are made to slide easily inside the vane cylinders 35, 36, and to have the minimum practical running clearance outside the rotors 37, 38 (are each formed with two blank annular portions $72^a$, $72^b$ and $73^a$, $73^b$, respectively, connected by the annular series of bars $78^a$, $78^b$, $79^a$, $79^b$. The blank annuli $72^a$, $73^a$ are respectively of axial length sufficient to cover at once the openings of both series of guide vanes $35^a$, $35^b$ and $36^a$, $36^b$; the annuli $72^b$, $73^b$ are respectively of sufficient length to cover the outlets of the forward running rotors 37, 38; the annular bars $78^a$, $79^a$ are of equal length with the reverse vanes $35^b$, $36^b$, and the bars $78^b$, $79^b$, preferably of somewhat greater length than the last. When the gates 72, 73, are in the positions shown in Figs. 12 and 13, which are the positions for maximum turbine power in the forward direction, being the extreme inward positions of the said sleeves, the inlets of the forward rotor-blades $37^a$, $38^a$, are uncovered by the outer ends of the blank annuli $72^a$, $73^a$, so that they are open to receive the fluid from the forward guide-vanes $35^a$, $36^a$, respectively. At the same time the outlet ends of the blades $37^a$, $38^a$ are free to discharge into the return chamber 65 through the openings between the bars $78^a$, $79^a$, while the reverse rotor-blades $37^b$, $38^b$, are wholly covered by the blank annuli $72^a$, $73^a$, so that undue eddy resistance on the edges of these blades is avoided. When the gates 72, 73, are moved as above described by the lever 90, through one-half of their possible travel, the blank annulus $72^a$, will cover, both the series of guide-vanes $35^a$, $35^b$, and the blank annulus $73^a$ both the series of vanes $36^a$, $36^b$, and the fluid will be shut off from all the rotor vanes. When the gates are further moved to their extreme outward positions so that the webs 74, 75, come respectively into contact with stops 82 and 83, which are the positions of maximum turbine power in the reverse direction, the forward rotor blades 37ª, 38ª, will still be closed by the blank annuli 72ª, 73ª, but the reverse blades 37ᵇ, 38ᵇ, will be uncovered by the inner ends of those annuli and will be open to admit fluid through the bars 78ª, 79ª, respectively and to discharge fluid into the vanes 35ᶜ and 36ᶜ through the bars 78ᵇ, 79ᵇ, respectively. This last position of the gate 72 is shown in Fig. 18, which is drawn on an enlarged scale.

As indicated in Figs. 16 and 17 the forward turbine-guide vanes 35ª, 36ª, and forward rotor-blades 37ª, 38ª, are of similar form to the blades 5 and 6 respectively shown in Figs. 2, 6 and 9, except that the outlet ends of the rotor blades are for convenience of construction directed radially outward instead of axially. The reverse guide-vanes 35ᵇ, 36ᵇ, will be recurved like those shown in Figs. 5 and 9 so as to reverse the tangential component of the motion of the fluid entering them from the helices 33 and 34. The reverse motor blades 37ᵇ, 38ᵇ, will be variously designed according to principles well understood, and as already set forth in connection with Figs. 8 to 11, to suit the conditions of fluid flow, according as the secondary, or turbine shafts, are required to revolve in the reverse direction at high velocities or, as usual in motor vehicles, the reverse velocity is intended to be at all times low.

The reverse rotor-blades 35ᶜ, 36ᶜ, are formed to suit the vanes, 35ᵇ, 36ᵇ, which discharge into them, but their outlet ends are preferably approximately tangential to axial planes, so that they discharge the fluid into the return chamber 65 without bodily rotation.

The case 1, may be fitted with a branch opening 95, Fig. 15, preferably leading from the helix 4, as shown, in a direction approximately tangential to the periphery of the pump rotor 2 for furnishing a supply of fluid under pressure for auxiliary purposes, as for instance to drive auxiliary turbines generating electric light, or for operating self-starting apparatus and the like.

Fluid may be drawn from the casing 1 by the same branch 95, or otherwise, and circulated through a radiator or cooler of usual type in order to dissipate the heat generated by fluid friction in the hydraulic apparatus, being returned to the casing 1, at a branch opening 96, leading into the return-chamber 65. Other branch openings may be formed in the case 1, such as the orifices 97 and 98 for respectively filling and emptying it; the orifice 99 into which a Pitot-tube may be inserted, being connected with a pressure gage so as to determine the total energy of the fluid discharged from the pump; and the orifice 100 opposite the periphery of the pump rotor, which may be utilized for purposes of speed regulation as follows:—As already explained the speed of the turbine shafts can be controlled at will by the turbine gates while the engine and pump rotor are driven at constant speed, the engine being governed by a centrifugal governor of any usual type. In this case, as also already explained, the fluid pressure generated by the pump will vary with the flow as controlled by the gates. Alternatively the engine governor may be replaced, in ways well understood, by a constant pressure governor, connected to the orifice 100 in such a manner as to maintain constant the pressure generated at the branch 100, i. e. at the periphery of the pump rotor 2, the result being that when the turbine gates are opened up, so that the circulation of fluid is increased, the speed of the engine automatically rises so as to maintain the pressure. By this arrangement the engine is automatically accelerated at the times of maximum demand for power. On the other hand when the turbine-gate openings are closed, with a consequent tendency of the fluid pressure to increase due to the reduced flow, the hydraulic governor automatically reduces the engine speed so as to maintain such pressure constant, and thus reduces the power lost in the pump and engine at times when little or no power is required from the secondary system.

In order to compensate for loss of fluid from the system by leakage or evaporation, the casing 1 may be connected, as by a branch pipe from the orifice 96, to a reservoir fixed at such a level as to automatically supply such loss by gravitation and keep the casing filled. Alternatively such supply reservoir may be maintained at sufficient pressure to supply such loss, by means of compressed air stored above the fluid, in a manner well understood.

We claim:—

1. In hydraulic transmission mechanism of the type having as driving element an outward flow centrifugal pump and as driven element an inward flow reaction turbine, helical chambers substantially as described surrounding the pump and turbine elements respectively and connected mouth to mouth, as and for the purposes set forth.

2. In hydraulic transmission mechanism an outward flow pump rotor discharging the circulated fluid into two peripheral helical chambers each surrounding substantially one half of the periphery of such rotor, and two turbine elements each receiving the circulated fluid discharged from one of such helical chambers as and for the purposes set forth.

3. In hydraulic transmission mechanism an outward flow pump element arranged to discharge portions of the circulated fluid simultaneously into a plurality of peripheral helical chambers each surrounding a portion of the periphery of the pump element and a plurality of turbine elements each receiving the portion of circulated fluid discharged from one of such chambers into a peripheral helical chamber, the helical chambers discharging and receiving each such portion of the circulated fluid being connected mouth to mouth, substantially as described.

4. In hydraulic transmission mechanism of the type specified, a double turbine rotor with a corresponding double peripheral series of non-rotatable guide-vanes surrounding it, one section of such guide-vanes being arranged to co-act with one section of such rotor to produce forward rotation, and the other pair of such sections being arranged to co-act to produce reverse rotation, with means for closing the outlets of either the forward guide-vanes, or the reverse guide vanes, or both together, at will, substantially as described.

5. In hydraulic transmission mechanism of the type specified, the combination, with two turbine elements, of double turbine rotors with a double peripheral series of guide-vanes in each such element, one section of the rotor and one section of such series of guide-vanes in each such element being arranged for forward rotation, and the other pair of such sections in each such element being arranged for reverse rotation, with means for closing the outlets of either the forward guide-vanes, or the reverse guide-vanes, or both together, at will.

6. In hydraulic transmission mechanism of the type specified, the combination, with an outward flow centrifugal pump, and one or more peripheral helical chambers into which said pump discharges the circulated fluid, of guide blades arranged at the periphery of the rotor of such pump as auxiliaries to such helical chambers in directing the flow of the fluid, substantially as described.

7. In hydraulic transmission mechanism of the type specified, the combination, with turbine rotors fitted with blades for alternative forward and reverse rotation, of movable cylinder-gates having blank portions arranged to surround the inlet and outlet edges of the reverse blades when the forward blades are in operation, substantially as and for the purpose described.

8. In hydraulic transmission mechanism, the combination, with a turbine element and a pump element, of a helical chamber surrounding each of said elements, said chambers being connected mouth to mouth; and a peripheral series of non-rotatable guide-vanes surrounding the turbine element and interposed between that element and its helical chamber, said vanes being arranged to reverse the tangential direction of motion of the circulated fluid delivered into said turbine element from its said helical chamber.

9. In hydraulic transmission mechanism, the combination, with a turbine element and a pump element, of a helical chamber surrounding each of said elements, said chambers being connected mouth to mouth; and separate peripheral series of forward and reverse guide-vanes surrounding the turbine element and interposed between that element and its helical chamber, the latter inclosing both series of guide-vanes and supplying fluid thereto.

10. In hydraulic transmission mechanism, the combination of a double-entry, centrifugal pump rotor: a pair of turbine rotors having their axes arranged at opposite sides of and substantially parallel with the axis of the pump rotor; a pair of helical chambers each of which surrounds one half of the periphery of said pump rotor; and a helical chamber surrounding each turbine element, each of the last-named chambers being connected mouth to mouth with the adjacent first-named chamber.

In testimony whereof we have hereunto set our hands in presence of two subscribing witnesses.

ANTHONY GEORGE MALDON MICHELL.
HENRY CLEMENT NEWTON.

Witnesses:
EDWARD WATERS,
EDWARD N. WATERS.